(12) United States Patent
Takahashi

(10) Patent No.: US 7,563,526 B2
(45) Date of Patent: Jul. 21, 2009

(54) FUEL CELL SYSTEM AND METHOD FOR REMOVAL OF WATER FROM FUEL CELLS

(75) Inventor: Shinichi Takahashi, Vernon, CT (US)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 496 days.

(21) Appl. No.: 10/637,660

(22) Filed: Aug. 11, 2003

(65) Prior Publication Data

US 2005/0037247 A1    Feb. 17, 2005

(51) Int. Cl.
*H01M 8/18* (2006.01)
*H01M 8/10* (2006.01)
*H01M 2/00* (2006.01)
*H01M 2/02* (2006.01)

(52) U.S. Cl. .............. 429/21; 429/19; 429/22; 429/12; 429/34; 204/DIG. 4

(58) Field of Classification Search .......... 429/12, 429/21, 22, 19, 34
See application file for complete search history.

(56) References Cited

U.S. PATENT DOCUMENTS

| | | | |
|---|---|---|---|
| 4,839,247 A * | 6/1989 | Levy et al. ............ 429/21 |
| 5,798,186 A | 8/1998 | Fletcher et al. |
| 6,248,462 B1 | 6/2001 | Bonville |
| 6,358,637 B1 | 3/2002 | Fuss |
| 6,432,568 B1 | 8/2002 | Salvador et al. |
| 6,479,177 B1 | 11/2002 | Roberts et al. |
| 6,528,194 B1 | 3/2003 | Condit et al. |
| 6,562,503 B2 | 5/2003 | Grasso et al. |
| 6,926,982 B2 * | 8/2005 | Ito et al. ............ 429/21 |
| 2001/0010872 A1 | 8/2001 | Suzuki et al. |
| 2001/0055707 A1 | 12/2001 | Roberts et al. |
| 2002/0038732 A1 * | 4/2002 | Sugiura et al. ........ 180/65.2 |
| 2002/0114984 A1 * | 8/2002 | Edlund et al. ......... 429/19 |
| 2002/0146610 A1 * | 10/2002 | Hayashi et al. ......... 429/30 |
| 2002/0168556 A1 * | 11/2002 | Leboe et al. .......... 429/13 |
| 2002/0177022 A1 | 11/2002 | Shimonosono et al. |
| 2003/0031900 A1 | 2/2003 | Tajima et al. |
| 2003/0039870 A1 | 2/2003 | Busenbender |
| 2003/0077487 A1 | 4/2003 | Roberts et al. |
| 2003/0118883 A1 | 6/2003 | Breault et al. |
| 2003/0129461 A1 | 7/2003 | Bruck et al. |
| 2003/0134168 A1 | 7/2003 | Assarabowski et al. |
| 2003/0207162 A1 * | 11/2003 | Reiser ............... 429/22 |

* cited by examiner

*Primary Examiner*—Patrick Ryan
*Assistant Examiner*—Helen O Chu
(74) *Attorney, Agent, or Firm*—McDermott Will & Emery LLP

(57) ABSTRACT

A fuel cell system is provided which generates electricity by supplying fuel gas and oxidant gas to a fuel cell stack comprising a fuel cell stack, a DC power supply, and a controller. The DC power supply comprises at least one of a generator and battery. The controller is programmed to determine whether or not the fuel cell stack is generating electricity, and to supply current to the fuel cell stack by at least one of the generator and the battery when generation of electricity by the fuel cell stack is terminated. The current supplied to the fuel cell stack removes residual water in the fuel cell stack by electrolytically reducing the water into hydrogen and oxygen gasses which are subsequently purged from the fuel cell stack.

17 Claims, 11 Drawing Sheets

FUEL CELL SYSTEM AND METHOD FOR REMOVAL OF WATER FROM FUEL CELLS

TECHNICAL FIELD OF THE INVENTION

This invention relates to fuel cell systems and in particular fuel cell systems for use in motor vehicle applications.

BACKGROUND OF THE INVENTION

Fuel cells have been developed as alternative power sources for motor vehicles, such as electrical vehicles. A fuel cell is a demand-type power system in which the fuel cell operates in response to the load imposed across the fuel cell. Typically, a liquid hydrogen containing fuel, for example, gasoline, methanol, diesel, naphtha, etc. serves as a fuel supply for the fuel cell after the fuel has been converted into a gaseous stream containing hydrogen. The conversion to the gaseous steam is usually accomplished by passing the fuel through a fuel reformer to convert the liquid fuel to a hydrogen gas stream that usually contains other gases such as carbon monoxide, carbon dioxide, methane, water vapor, oxygen, and unburned fuel. The hydrogen is then used by the fuel cell as a fuel in the generation of electricity for the vehicle.

A polymer electrolyte membrane type of fuel cell is generally composed of a stack of unit cells comprising a polymer electrolyte membrane enclosed between electrodes and gas diffusion layers, and further enclosed between separators that contain channels for fuel gas and oxidant gas. The stack is fixed by end plates. A current collector may be provided between the end plate and stack, or the end plate itself may function as current collector. When hydrogen is used as the fuel gas and oxygen is used as the oxidant gas, electrons are released due to a chemical reaction, and water is formed as a by-product, via the reaction:

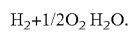
$$H_2 + 1/2 O_2 \rightarrow H_2O.$$

Consequently, the fuel cell is an energy source that has no adverse impact on the global environment, and has been the focus of much research for use in automobiles in recent years.

Although the water that is the product of the reaction is environmentally benign, when a large quantity of water reaction product accumulates in the fuel cell, it blocks the gas channels and the gas diffusion layers, causing a drop in electrical generation efficiency. In addition, if the fuel cell is exposed to sub-freezing temperatures, which are common in the temperate and polar latitudes, the accumulated water freezes in the fuel cell and blocks the gas channels. It is not possible to generate electricity from frozen fuel cells when the gas channels are clogged with ice. Even if a heater is used to melt the ice, it takes time melt the ice and thus rapid start up of an electrical vehicle is not possible with a frozen fuel cell.

Therefore, methods have been tried to reduce the quantity of water in the fuel cell stack before the stack freezes, to facilitate the generation of electricity in subfreezing ambients. One such method is to increase the flow rate of fuel gas and oxidant gas to blow the accumulated water out of the channels after electrical generation is shut down. Another method is to vacuum dry the channels, as in U.S. Pat. No. 6,358,637. However, these methods take a substantial amount of time to dry the fuel cell to an acceptable level. This is probably because it is difficult to eliminate water from the small cavities in the gas diffusion layer and the electrode when attempting to dry the fuel cell by gas purge or vacuum drying.

Deterioration of electrical generation performance is especially problematic when water freezes in the portion of the electrode formed by a three-way interface, because the electrode reaction is obstructed.

Time-consuming methods of drying or heating fuel cells in automotive applications are not feasible, because rapid startup is required and the fuel cell frequently cycles between operating and shut down states.

SUMMARY OF THE INVENTION

There exists a need in the fuel cell art for a fuel cell system that reduces the amount of water that remains in the fuel cell after terminating electricity generation. There exists a need in the fuel cell art to prevent water produced by the fuel cell reaction from blocking gas channels and gas diffusion layers of fuel cells. There also exists a need in the fuel cell art to prevent water from freezing in fuel cell gas channels and gas diffusion layers. There exists a need in the fuel cell art for a rapid and efficient method of removing water from a fuel cell after terminating electricity generation.

There exists a need in the electrical vehicle art for electrical vehicles powered by fuel cells that rapidly and efficiently generate electricity upon demand. There exists a need in the electrical vehicle art for electrical vehicles powered by fuel cells which do not suffer from electrical generation startup delay due to frozen water blocking gas channels and gas diffusion layers.

These and other needs are met by certain embodiments of the present invention, which provide a fuel cell system which generates electricity by supplying fuel gas and oxidant gas to a fuel cell stack comprising a fuel cell stack, a DC power supply, and a controller. The DC power supply comprises at least one of a generator and battery. The controller is programmed to determine whether or not the fuel cell stack is generating electricity, and to supply current to the fuel cell stack by at least one of the generator and the battery when generation of electricity by the fuel cell stack is terminated.

The earlier stated needs are also met by certain embodiments of the present invention, which provide a motor vehicle comprising a fuel cell system which generates electricity by supplying fuel gas and oxidant gas to a fuel cell stack comprising a fuel cell stack, a DC power supply, and a controller. The DC power supply comprises at least one of a generator and battery. The controller is programmed to determine whether or not the fuel cell stack is generating electricity, and to supply current to the fuel cell stack by at least one of the generator and the battery when generation of electricity by the fuel cell stack is terminated.

The earlier stated needs are also met by certain embodiments of the present invention, which provide a fuel cell system which generates electricity by supplying fuel gas and oxidant gas to a fuel cell stack comprising a fuel cell stack, DC power supply, and a means of controlling a flow of current to the fuel cell stack. The DC power supply comprises at least one of a generator and battery. The means of controlling a flow of current to the fuel cell stack is equipped with a means of measuring the current flowing to the fuel cell stack while it is flowing. The means controls a voltage impressed on the fuel cell stack so that the current flowing to the fuel cell stack reaches a predetermined amperage.

The earlier stated needs are further met by certain embodiments of the present invention, which provide a motor vehicle comprising a fuel cell system which generates electricity by supplying fuel gas and oxidant gas to a fuel cell stack comprising a fuel cell stack, DC power supply, and a means of controlling a flow of current to the fuel cell stack. The DC power supply comprises at least one of a generator and battery. The means of controlling a flow of current to the fuel cell stack is equipped with a means of measuring the current flowing to the fuel cell stack while it is flowing. The means controls a voltage impressed on the fuel cell stack so that the current flowing to the fuel cell stack reaches a predetermined amperage.

In addition, the earlier stated needs are also met by certain embodiments of the present invention, which provide a method of removing water from a fuel cell system. The fuel cell system comprises a fuel cell stack having at least one unit cell, a DC power supply and a programmable controller. The DC power supply comprises at least one of a generator and battery. The method comprises the steps of generating electricity from the fuel cell stack by supplying fuel gas and oxidant gas to the fuel cell stack. When generation of electricity from the fuel cell stack is terminated, the termination of the generation of electricity is determined by the fuel cell stack using the programmable controller, which is also used to supply current to the fuel cell stack from the DC power supply.

The present invention addresses the need for a fuel cell system that rapidly and efficiently removes water from a fuel cell after the termination of the generation of electricity. The present invention further addresses the need for a method that rapidly and efficiently removes water from a fuel cell after terminating the generation of electricity. The present invention also addresses the need for a motor vehicle with a fuel cell system that rapidly and efficiently starts up in subfreezing ambients.

The foregoing and other features, aspects, and advantages of the present invention will become apparent in the following detailed description of the present invention when taken in conjunction with the accompanying drawings.

DETAILED DESCRIPTION OF THE INVENTION

The present invention provides a fuel cell system that rapidly and efficiently removes water from a fuel cell after terminating the generation of electricity. The present invention also provides a motor vehicle with a fuel cell system that rapidly and efficiently starts up in subfreezing ambients. These benefits are provided by providing current to a fuel cell stack after terminating the generation of electricity to electrolytically breakdown the water remaining in the fuel cell into hydrogen gas and oxygen gas.

Figure 1A:
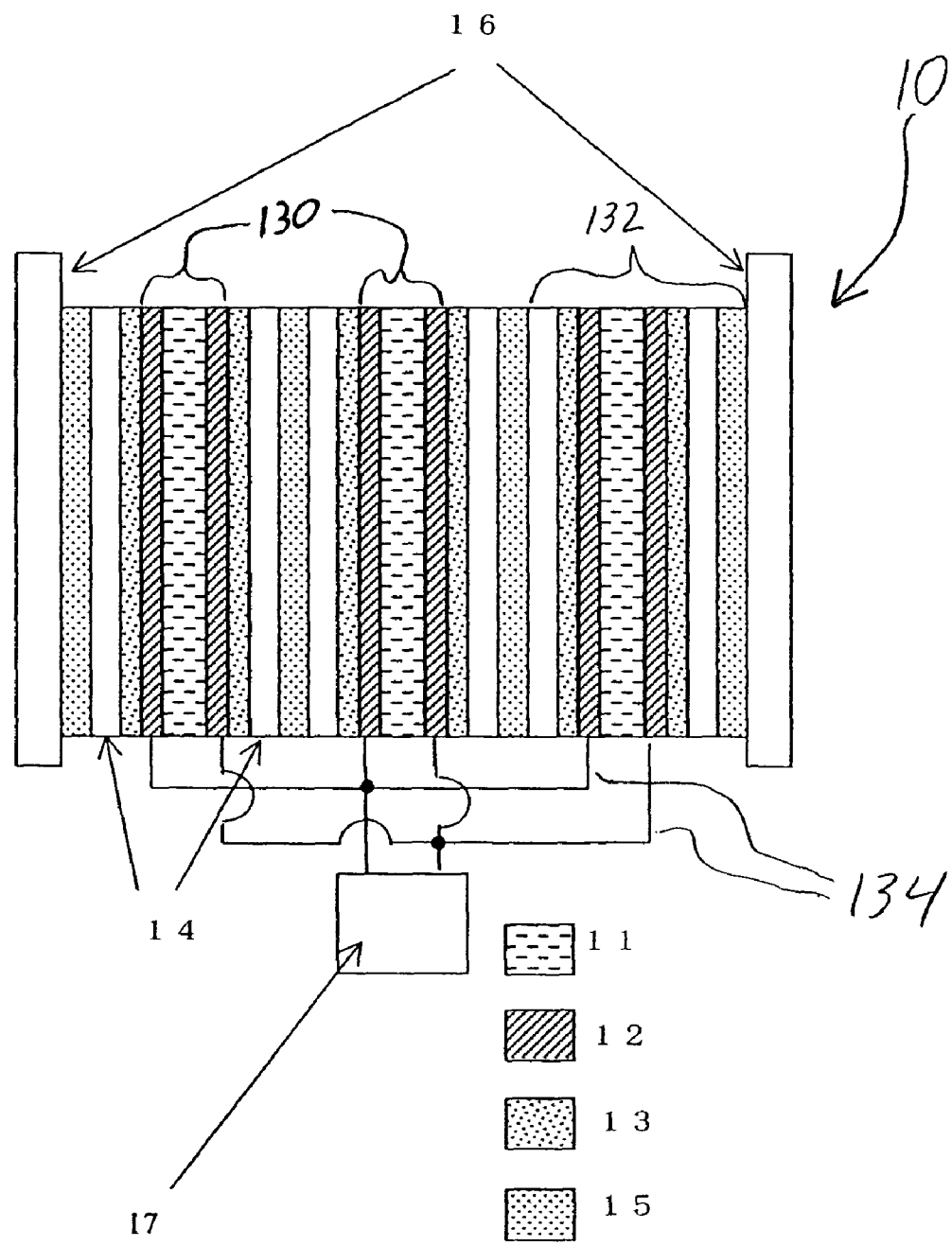
FIG. 1A schematically illustrates a cross-section of a fuel cell stack according to an embodiment of the present invention.

A fuel cell stack 10 used in certain embodiments of the present invention is illustrated in FIG. 1A. Fuel cell stacks 10 comprise at least one unit cell 132 equipped with a membrane electrode assembly 130 constructed of a polymer electrolyte membrane 11 enclosed between two electrodes 12, gas diffusion layers 13, and separator 15. Fuel gas and oxidant gas are supplied to the unit cells via gas channels 14 and the unit cells are 132 are stacked between end plates 16. Electrical current is supplied to the fuel cell stack 10 according to the present invention via conductors 134 and the current flow is controlled by a means for controlling current flow 17. When current flows to the fuel cell stack 10, an electrolytic reaction takes place, opposite to that of electricity generation, as follows:

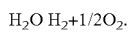

$H_2O \rightarrow H_2 + 1/2 O_2$.

This reaction consumes water in the polymeric solid electrolyte membranes 11, electrode areas 12, gas channels 14, and gas diffusion layers 13 of the fuel cell stack 10. Thus, the quantity of water retained in the fuel cell stack 10 is reduced, and the fuel cell stack 10 can be easily started when the ambient temperature is below the freezing point because gas flow is not blocked by ice. The electrolytic decomposition of water requires that the current flows to the fuel cell stack in such a way that hydrogen is produced at the fuel electrode, and oxygen is produced at the oxidant electrode. For this purpose, an anode of a DC power supply selected from at least one of a generator and a battery is connected with an anode of the fuel cell stack 10 and a cathode of the DC power supply of at least one of the generator and the battery is connected with a cathode of the fuel cell stack. In a fuel cell, the reaction that electrolyzes water occurs when the voltage impressed when the current flows to the fuel cell stack is 1.23 V or more. To avoid damage to the fuel cell stack, it is desirable that the maximum impressed voltage be about 5 V.

In certain embodiments of the present invention, the means of controlling the flow of current to the fuel cell stack 17 is equipped with a means of measuring the current flowing to the fuel cell stack. The means of controlling the flow of current to the fuel cell stack 17 also controls the voltage impressed on the fuel cell stack 10, so that the current flowing to the said fuel cell stack reaches a predetermined amperage and the reaction that electrolyzes water proceeds at a constant amperage. If the voltage, rather than the current were constant, the electrolysis reaction of the water would cease when there was only a small amount of water inside the fuel cell stack. Therefore, it is desirable to control the voltage so that current flows at a constant amperage.

Figure 1B:
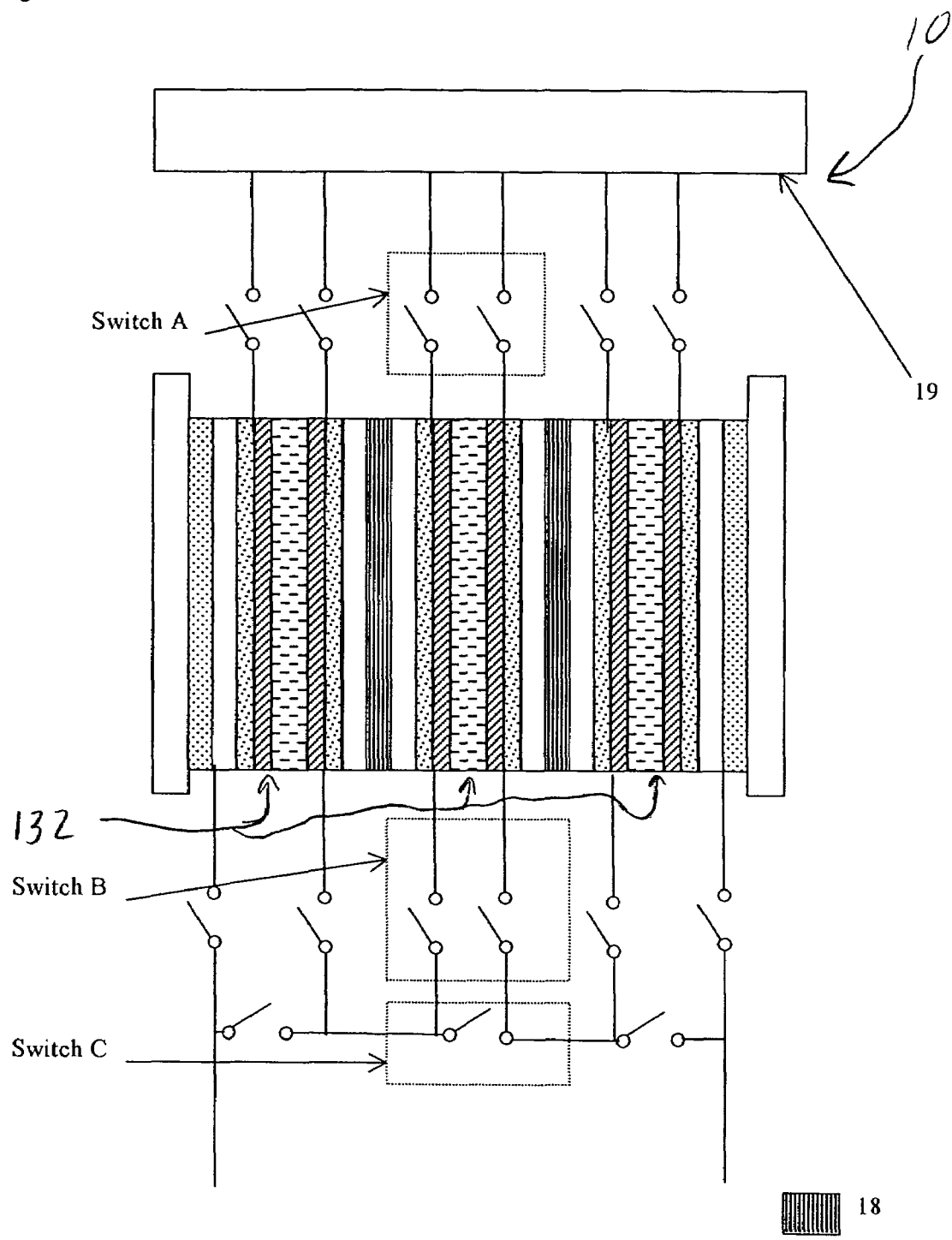
FIG. 1B schematically illustrates a cross-section of a fuel cell stack and a system of supplying current to individual cells according to an embodiment of the present invention.

In certain embodiments of the present invention, the means of controlling the flow of current to the fuel cell stack 10 is connected to each unit cell 132 that composes the fuel cell stack 10. Thus, current can flow simultaneously to all the unit cells 132, shortening the time required to electrolyze the water, as shown in FIG. 1B.

In another embodiment of the fuel cell system according to the present invention, the flow of electrical current is controlled so that current can be supplied at discretion to at least one or more of the unit cells 132 that compose the fuel cell stack 10. Each unit cell 132 is electrically insulated from neighboring unit cells by electrical insulation 18 positioned between each unit cell 132. Therefore, according to this embodiment of the present invention, it is possible to selectively electrolyze the water in only the unit cells that have a high moisture content. In certain embodiments of the invention, more than two unit cells can be isolated from the other cells. If the resistance of a particular unit cell is low and the cell voltage is lower than the average cell voltage of the stack or a predetermined value, the fuel cell system of the present invention can determine that the cell is flooding, (i. e.—there is too much water in the unit cell, thus fuel and oxidant gas is blocked).

In certain embodiments of the present invention, the flow of electrical current to selected unit cells is controlled by an array of switches A, B, and C. FIG. 1B illustrates individual, electrically insulated, unit fuel cells 132 wherein switches A, B, C are adapted to electrically connect and disconnect the unit cells 132 so that current can be selectively supplied where needed. In normal operation, the status of switches A, B, and C for each cell is as follows:

Switch A: Open
Switch B: Close
Switch C: Open.

Closing switch B and opening switch A allows the center cell, which is isolated from the other cells by electrical insulation 18, to connect to the other cells in series.

If the center cell has too much water, the status of switches for only the center cell are changed as follows in order to supply current to the center cell:

Switch A: Close
Switch B: Open
Switch C: Close.

Opening switch B and closing switch C electrically isolates the center cells from the other cells. The cells adjacent the center cell are connected to each other. Therefore, the power supply 19 can selectively supply current to the center cell without stopping fuel cell stack operation.

In another embodiment of the present invention, the system is controlled so that current flows to the unit cell 132 that contacts the end plate 16 and to a continuous series of at least one and at most ten unit cells. According to an embodiment of the present invention it is possible to electrolyze water only in the unit cells adjacent both ends of the stack 10, where water is most likely to condense. The heat capacity of the end plates 16 is larger than the unit cells 132 so that the unit cells that contact the end plate are more likely to have larger amounts of water condensed within than other unit cells.

In another embodiment of the present invention, the fuel cell system comprises a means of shutting off the flow of current to the fuel cell stack that shuts off the flow of current to a fuel cell stack when the duration of current flow to the fuel cell stack reaches a predetermined time.

In another embodiment of the present invention, the fuel cell system has a means of measuring the flow rate of fuel gas ($H_2$) in the gas discharged from a fuel gas discharge port of the fuel cell stack. The means of shutting off the current flow to the fuel cell stack shuts off the flow of current to the fuel cell stack if it determines that the flow rate of the fuel gas falls below the value that is measured before supplying current to the stack.

In another embodiment of the present invention, the fuel cell system has a means of measuring the humidity of the gas discharged from a fuel gas discharge port or an oxidant gas discharge port of the fuel cell stack. The means of shutting off the current flow to the fuel cell stack shuts off the flow of current to the fuel cell stack if the means of measuring humidity determines that the humidity of the gas discharged from the fuel gas discharge port or the oxidant gas discharge port falls below a predetermined value.

In another embodiment of the present invention, the fuel cell system has a means of measuring the moisture content of the polymer electrolyte membrane in the fuel cell stack. The means of shutting off the current flow is controlled so that the flow of current to the fuel cell stack is shut off if the means of measuring the moisture content of polymer electrolyte membrane determines that the moisture content falls below a predetermined value.

Thus, the various embodiments of the invention make it possible to avoid damage to the fuel cell stack due to excessive current flow, and to reduce the energy consumption needed for electrolysis.

In another embodiment of the present invention, the fuel cell system has a means of measuring the moisture content of the polymer electrolyte membrane in the fuel cell stack. The means of measuring the moisture content of the polymer electrolyte membrane measures the resistance of at least some of the cells in the fuel cell stack, and calculates the moisture content based on the resistance of the cells. Thus, it is possible to measure the moisture content of the polymer electrolyte membrane without providing a humidity sensor inside the unit cell.

In another embodiment of the present invention, the fuel cell system is controlled, so that, when current flows to the fuel cell stack, the fuel gas and oxidant gas inside the fuel cell stack are simultaneously discharged from the fuel cell. The progress of the electrolytic reaction is not obstructed, as it would be if the hydrogen and oxygen produced by electrolysis remained in the unit cell. This can be implemented by purging the cell with an inert gas, such as nitrogen, or by providing a pump to suction the gas at the gas discharge port of the fuel cell stack.

In another embodiment of the invention, the fuel cell system contains a means of burning the fuel gas discharged from the fuel cell stack. Burning the fuel gas discharged from the fuel cell stack prevents the undesirable release of flammable gases, such as hydrogen, into the atmosphere.

This invention will be further described in conjunction with the following specific examples of fuel cell systems. However, these are exemplary only, as the claimed invention is not limited to the specific examples disclosed herein.

EXAMPLE 1

Figure 2:
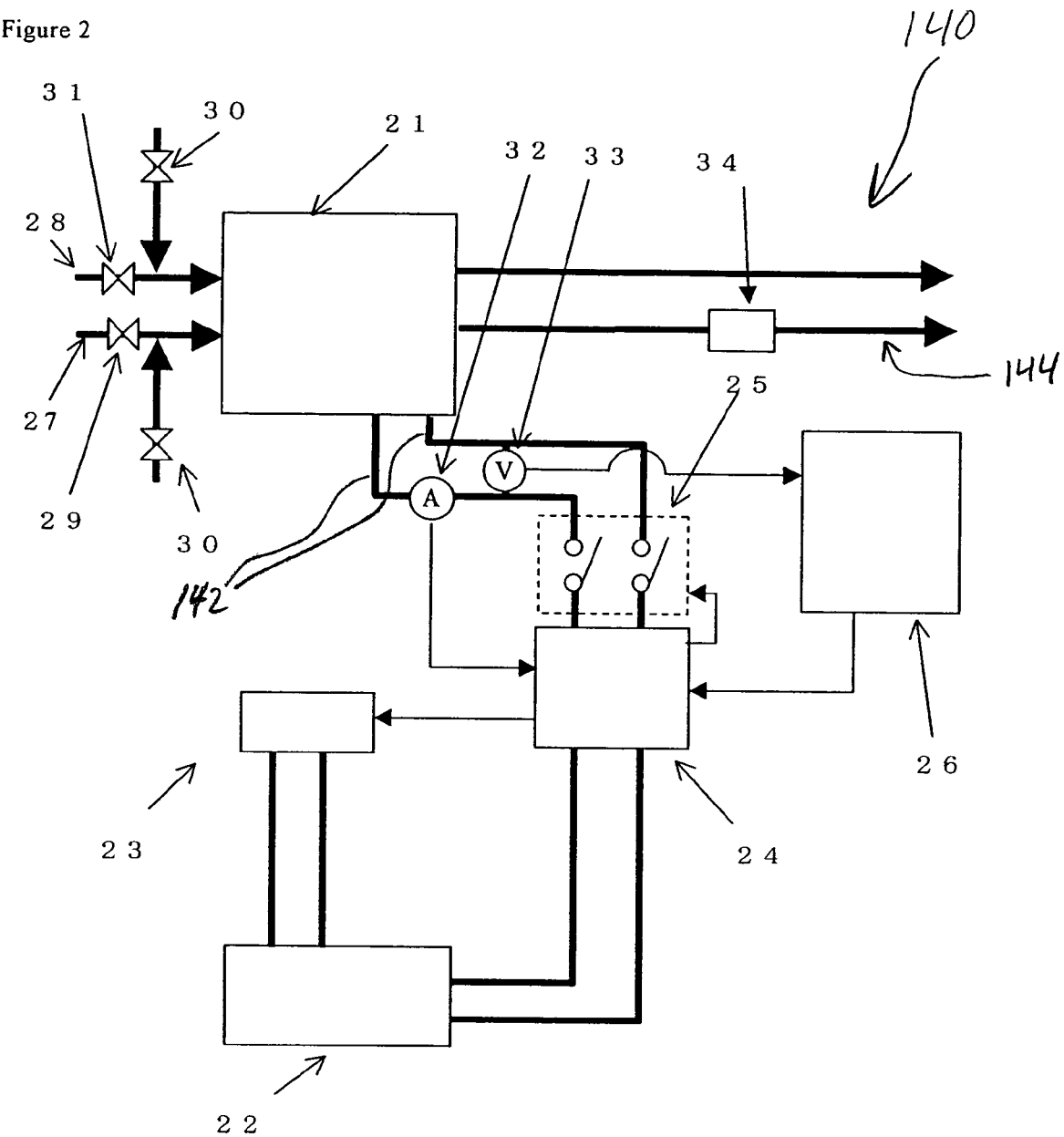
FIG. 2 illustrates a fuel cell system according to an embodiment of the present invention, as described in Example 1.

FIG. 2 shows the outline of a fuel cell system 140 according to an embodiment of the present invention. Hydrogen is supplied to the fuel cell stack 21 via the anode gas supply line 27. Air is supplied to the fuel cell stack 21 via the cathode gas supply line 28. Nitrogen gas supply valves 30 are also provided for the purpose of purging the fuel cell stack 21 during shutdown. A catalytic hydrogen burner 34 is provided in the anode discharge line 144, to burn the hydrogen produced by electrolysis. A battery 22 is charged by electric power from a generator 23. An ammeter 32 and a voltmeter 33 are provided in the electrical current line 142 to the fuel cell stack 21. An output signal from the ammeter 32 is outputted to a means 24 of controlling the flow of current to the fuel cell stack. The output signal from the voltmeter 33 is outputted to a means 26 of shutting off the flow of current to the fuel cell stack. The means 26 of shutting off the flow of current to fuel cell stack outputs the control signal of means 24 of controlling the flow of current to the fuel cell stack. While the fuel cell system is generating electricity, the hydrogen supply valve 29 and air supply valve 31 are open, and the nitrogen supply valves 30 are closed.

The generator 23 generates electricity to charge the battery 22, and the switch 25 is shut off, while the fuel cell stack 21 is generating electricity. When the fuel cell stack electrical generation is shut down, the hydrogen supply valve 29 and air supply valve 31 are closed, the nitrogen supply valve 30 is opened, and a nitrogen purge of fuel cell system is started.

Figure 3:
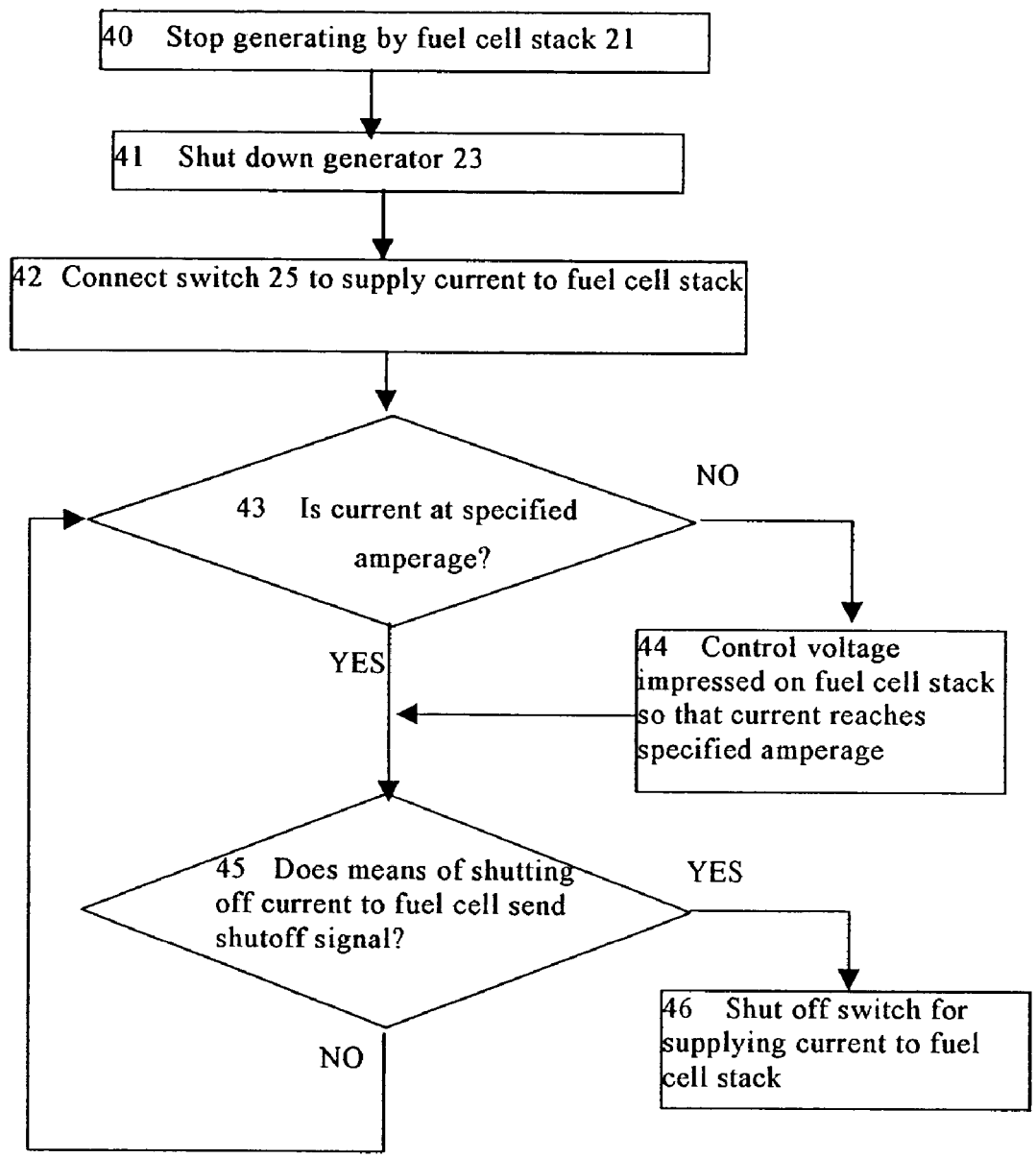
FIG. 3 is a flow chart illustrating the operation of the means of controlling the flow of current to the fuel cell stack.
Figure 4:
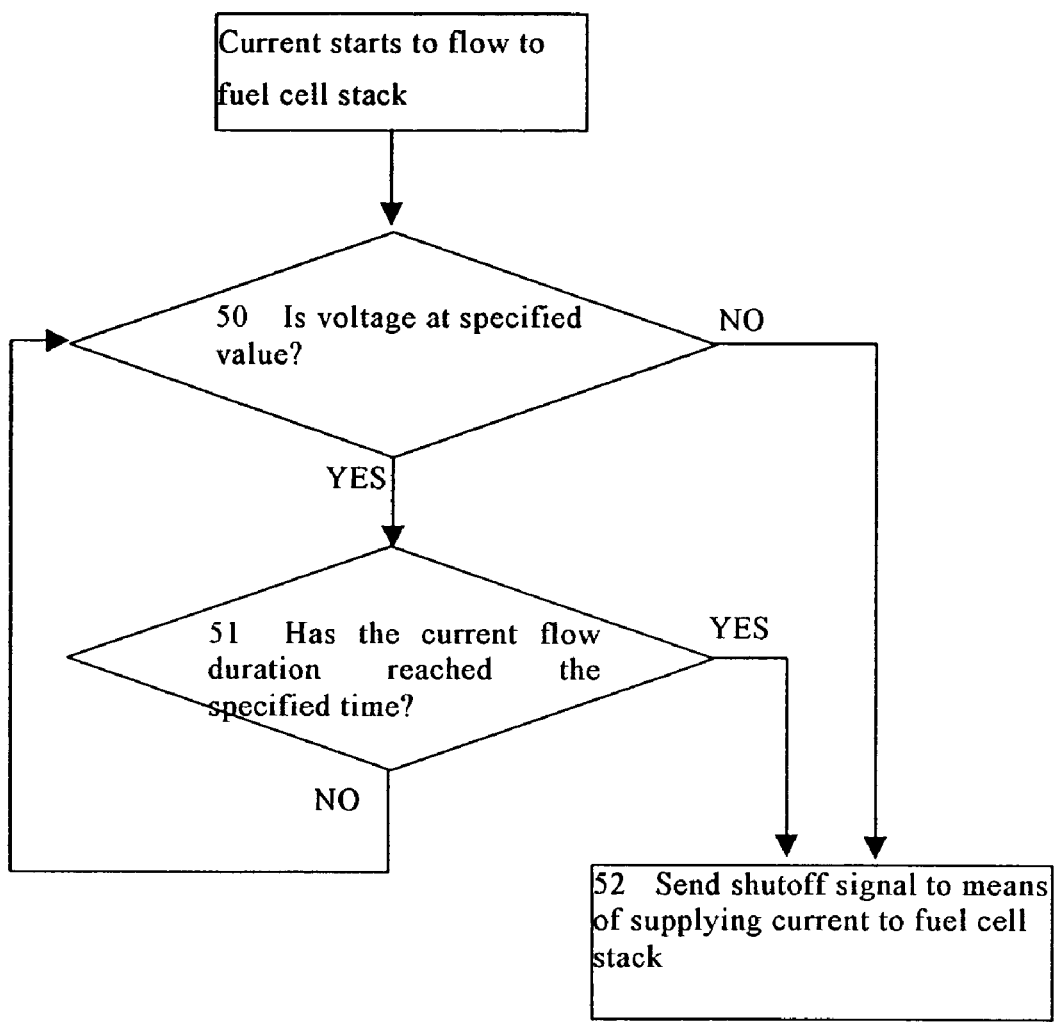
FIG. 4 is a flow chart illustrating operation of the means of shutting off the flow of current to the fuel cell stack according to an embodiment of the present invention, as described in Example 1.

The flow of current to the fuel cell is controlled by a means 24 of supplying current to the fuel cell. FIG. 3 shows a flow chart of this process. Although the specified value at step 43 is 200 mA/cm$^2$ in this example, the specified value varies with the structure of the fuel cell system 140. When current starts to flow to the fuel cell stack 21, means 26 of shutting off the flow of current to the stack monitors the status of current flow to the fuel cell stack 21. FIG. 4 shows an operational flow chart of the means 26 of shutting off the flow of current to the fuel cell. The specified value at step 50 varies with the structure of the fuel cell system, but in this example the value is 5V. Although, the specified time at step 51 is 10 minutes in this example, the specified time varies with the structure of the fuel cell system. After electrical generation was terminated, the fuel cell stack 21 of this example was stored for 8 hours at −20° C. and then fuel gas and oxidant gas was again introduced into the fuel cell stack 21. The fuel cell stack 21 was then able to generate electricity without any special means of thawing.

EXAMPLE 2

Figure 5:
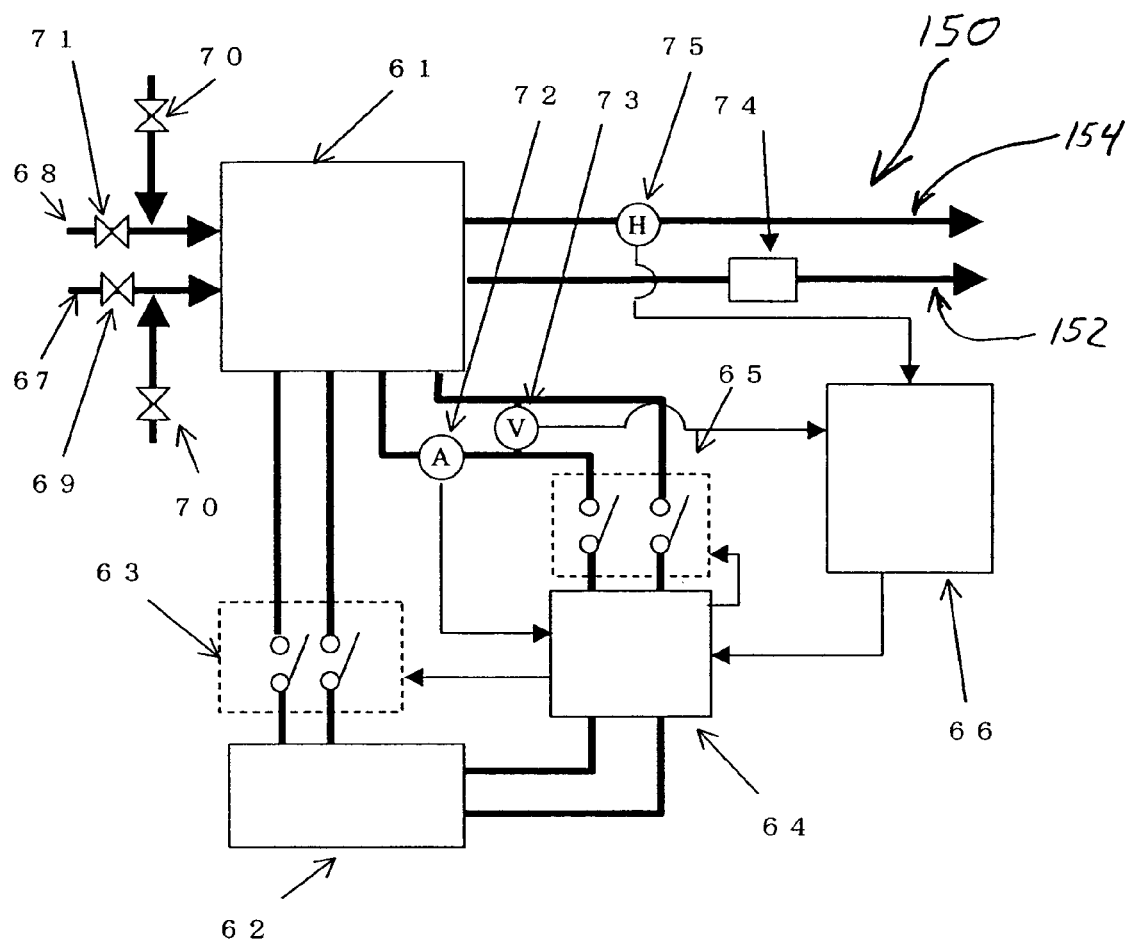
FIG. 5 illustrates a fuel cell system according to an embodiment of the present invention, as described in Example 2.

FIG. 5 illustrates the outline of a fuel cell system 150 according to another embodiment of the present invention. The fuel cell stack 61 is composed of 20 unit cells. Hydrogen is supplied via an anode gas supply line 67, and air is supplied via a cathode gas supply line 68. Nitrogen gas supply valves 70 are also provided for the purpose of purging the fuel cell stack 61 during shutdown. A catalytic hydrogen burner 74 is provided in the anode discharge line 152, to burn the hydrogen produced by electrolysis. A humidity sensor 75 is provided in the cathode discharge line 154. The fuel cell stack 61 and the battery 62 are connected via the battery switch 63. The battery 62 is also connected to a means 64 of controlling the flow of current to the fuel cell stack. In addition, five unit cells (not shown) from each of the two end plates of the fuel cell stack 61 are each connected, via a switch 65 to a means 64 of controlling the flow of current to the fuel cell stack. Each of these unit cells is also provided with a unit cell ammeter 72 and a unit cell voltmeter 73. The output signal of the unit cell ammeter 72 is outputted to the means 64 of controlling the flow of current to the fuel cell stack. The output signal of the unit cell voltmeter 73 is outputted to the means 66 of shutting off the flow of current to the fuel cell stack. The means 66 of shutting off the flow of current to the fuel cell stack outputs the control signal of the means 64 of controlling the flow of current to the fuel cell stack.

While the fuel cell stack is generating electricity, the hydrogen supply valve 69 and air supply valve 71 are open, and the nitrogen supply valve 70 is closed. The battery switch 63 is connected, and the switch 65 is shut off. When the fuel cell stack electrical generation is shut down, the hydrogen supply valve 69 and air supply valve 71 are closed, and the nitrogen supply valve 70 is opened, and the nitrogen purge of the fuel cell system 150 is started. Current is flowed to the fuel cell stack 61 and the flow of current to the fuel cell stack 61 is controlled by a means 64 of supplying current to the fuel cell stack. The flow chart for this process is the same as in FIG. 3.

Figure 6:
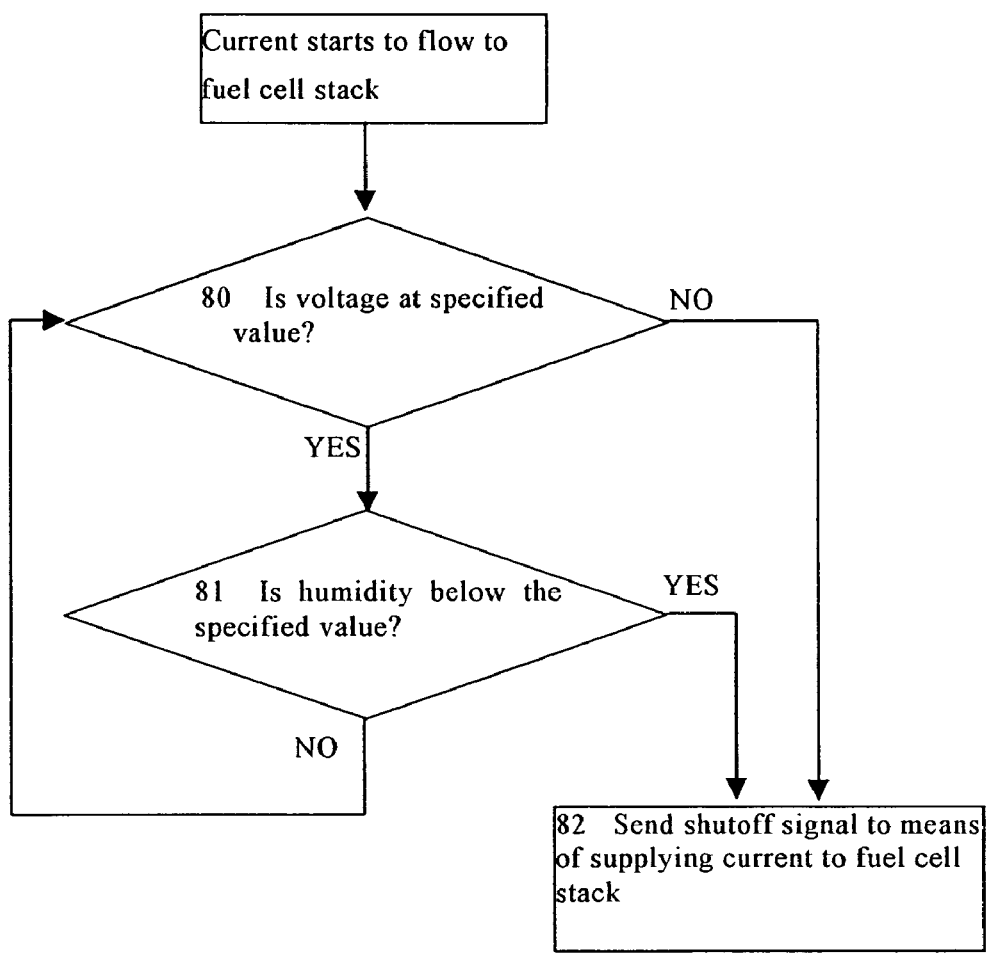
FIG. 6 is a flow chart illustrating operation of the means of shutting off the flow of current to the fuel cell stack according to an embodiment of the present invention, as described in Example 2.

When current starts to flow to the fuel cell stack 61, a means 66 of shutting off the flow of current to the fuel cell stack monitors the status of current flow to the fuel cell stack 61. FIG. 6 shows a flow chart of the operation of the means 66 of shutting off the flow of current to the fuel cell stack. The specified value at step 80 varies with the structure of the fuel cell system, but in this example the value is 5V. The specified value for the relative humidity at step 81 is 50% in this example, but it varies with the structure of the fuel cell system. After electrical generation was terminated, the fuel cell stack 61 of this example was stored for 8 hours at −20° C. and then fuel gas and oxidant gas was again introduced into the fuel cell stack 61. The fuel cell stack 61 was then able to generate electricity without any special means of thawing.

EXAMPLE 3

Figure 7:
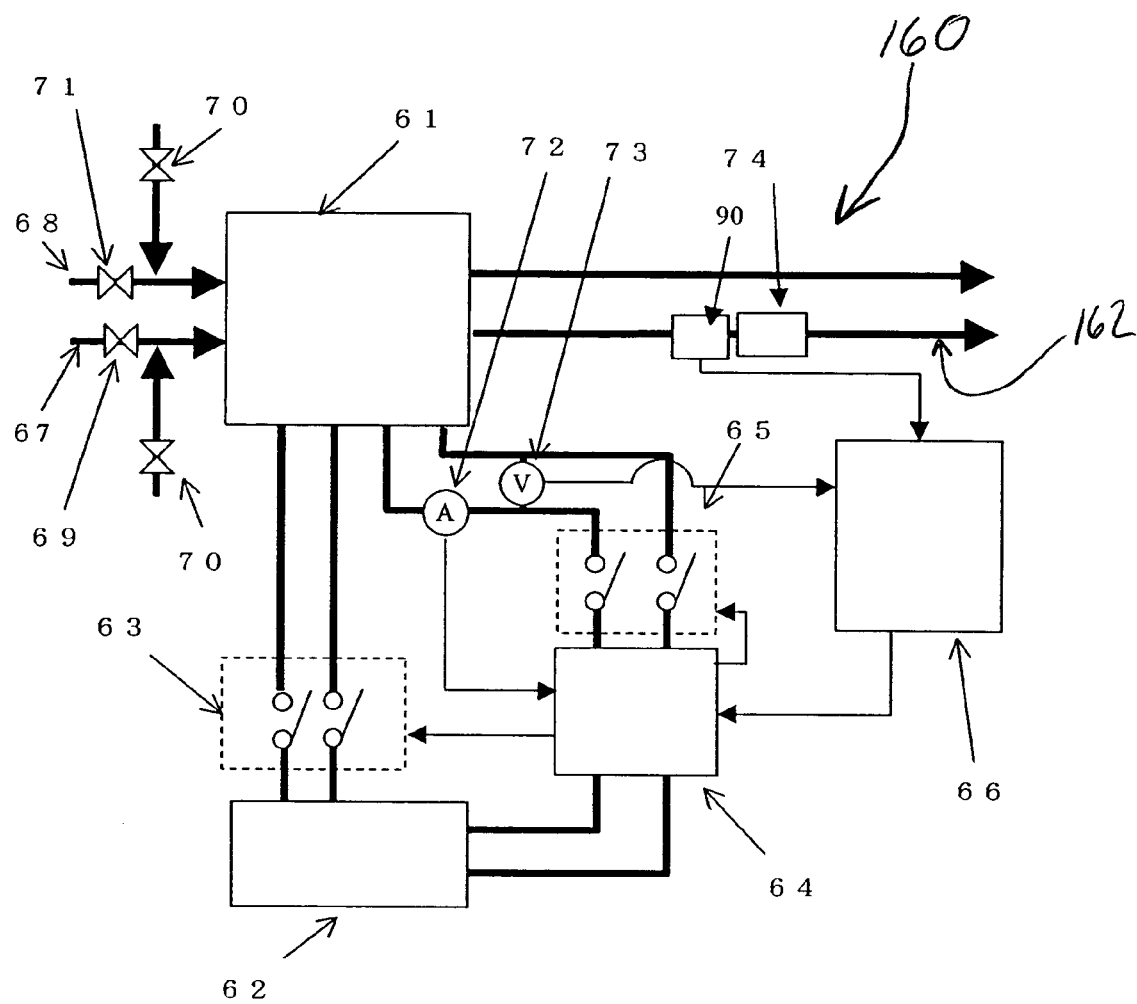
FIG. 7 illustrates a fuel cell system according to an embodiment of the present invention, as described in Example 3.
Figure 8:
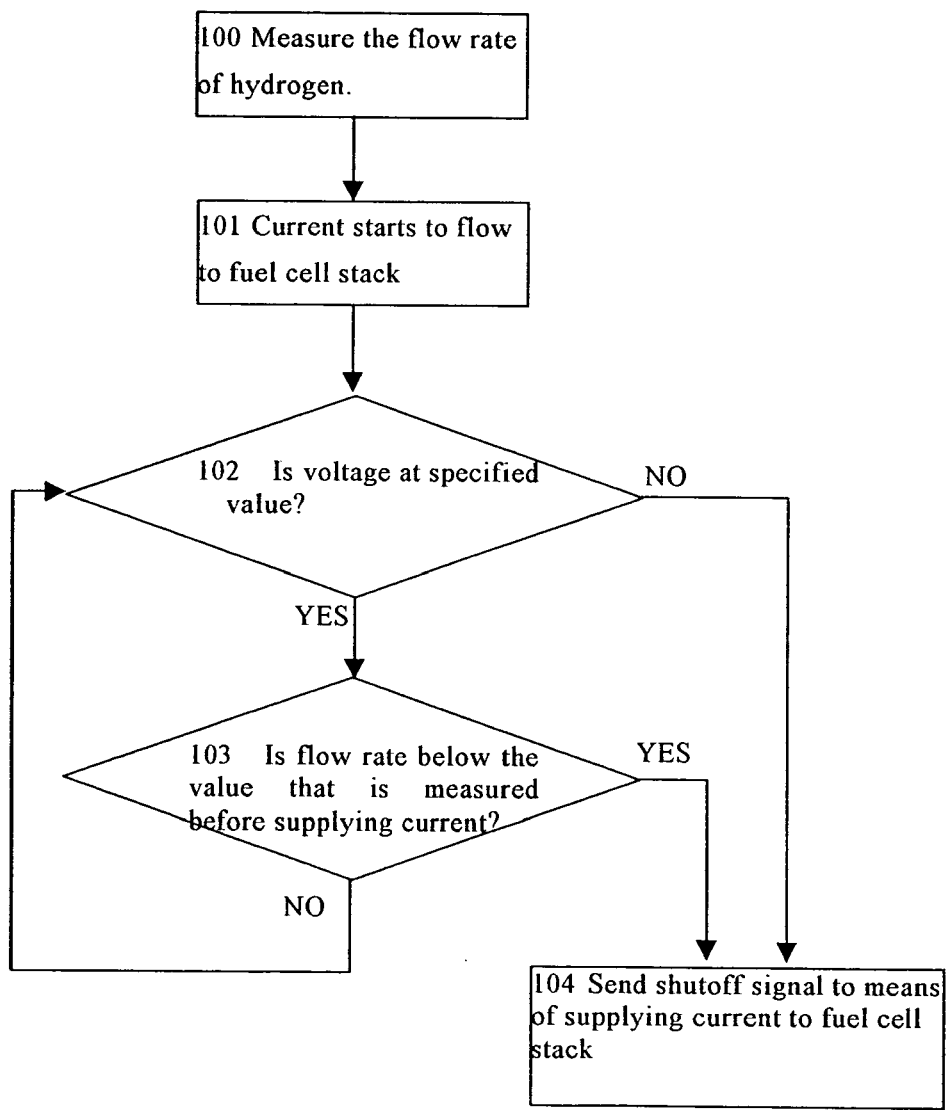
FIG. 8 is a flow chart illustrating operation of the means of shutting off the flow of current to the fuel cell stack according to an embodiment of the present invention, as described in Example 3.

An outline of a fuel cell system 160 according to another embodiment of the present invention is illustrated in FIG. 7. A H$_2$ flow meter 90 is located on the anode outlet 162. Other components are the same as example 2. Flow of current to the fuel cell stack 61 is controlled by a means 64 of supplying current to the fuel cell stack. The flow chart for this process is the same as in FIG. 3. FIG. 8 shows an operational flow chart of the means 66 of shutting off the flow of current to the fuel cell stack 61. The specified value at step 102 varies with the structure of the fuel cell system, but in this fuel cell system 160 the value is 5V. The H$_2$ flow meter 90 measures H$_2$ flow rate before the current is supplied at step 100. While current is supplied, the H$_2$ flow rate is checked at step 103. If the H$_2$ flow rate is lower than the value that is measured at step 100, it is determined that the excess water is eliminated from the fuel cell stack 61, and current flow to the fuel cell stack 61 is terminated at step 104.

EXAMPLE 4

Figure 9:
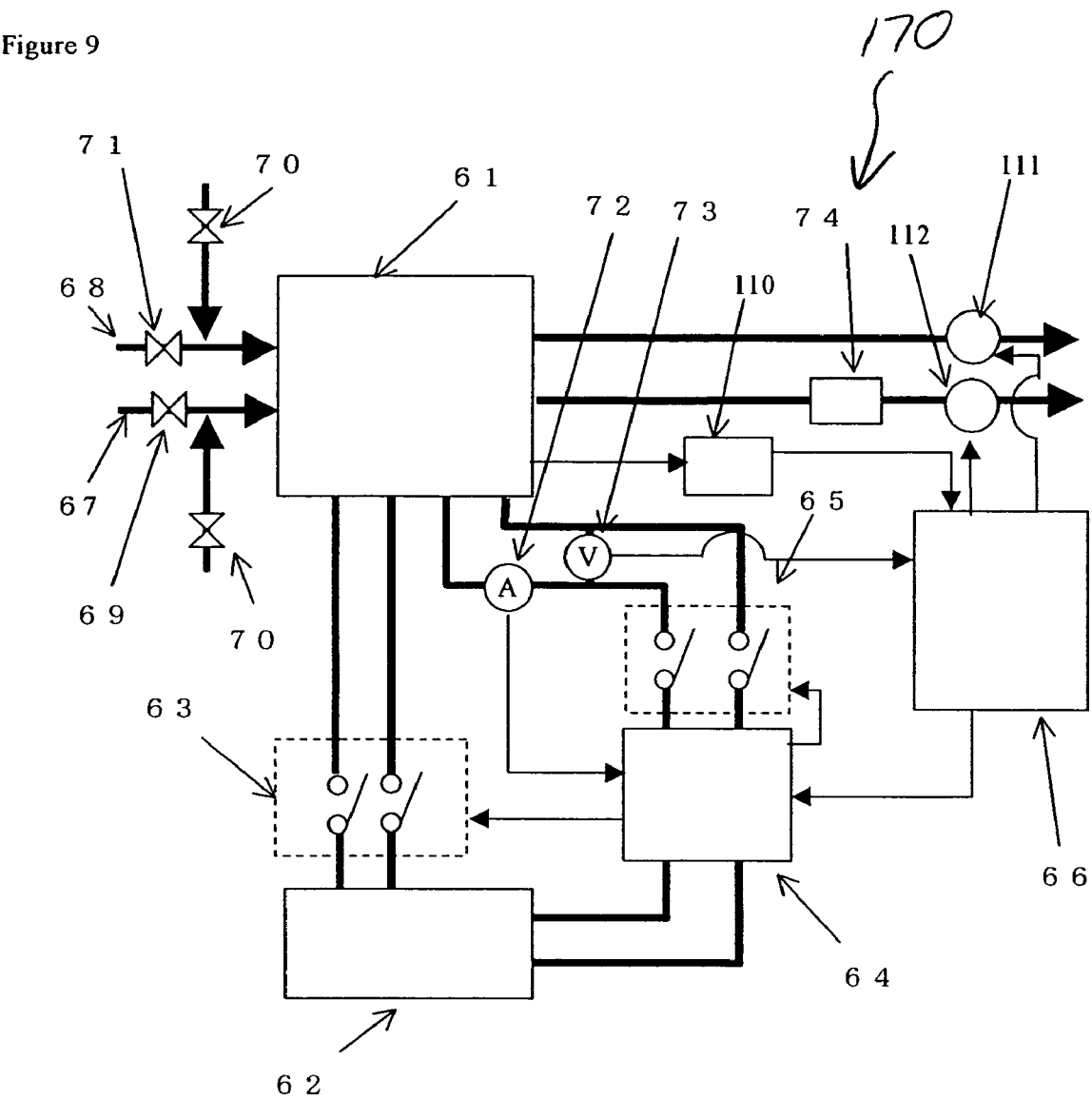
FIG. 9 illustrates a fuel cell system according to an embodiment of the present invention, as described in Example 4.
Figure 10:
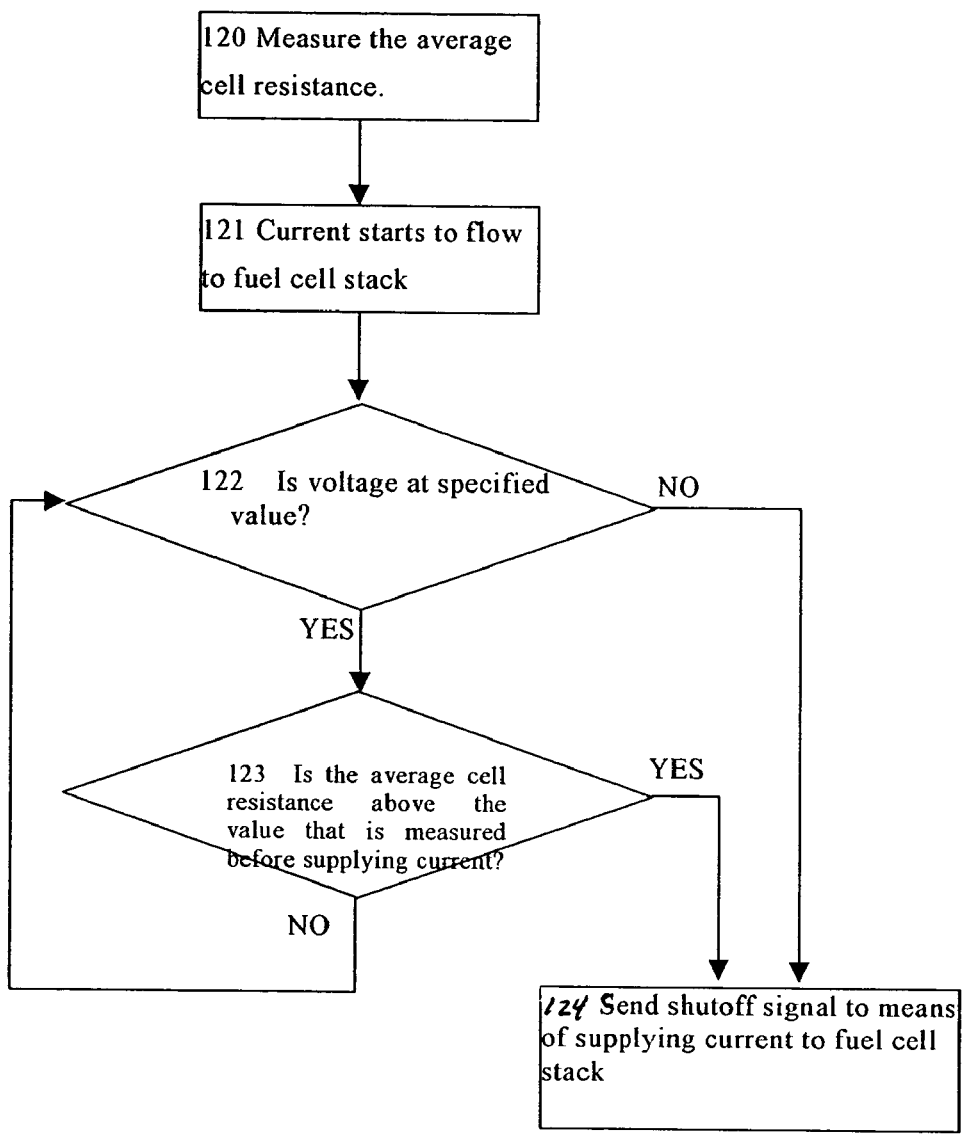
FIG. 10 is a flow chart illustrating operation of the means of shutting off the flow of current to the fuel cell stack according to an embodiment of the present invention, as described in Example 4.

An outline of a fuel cell system 170, according to another embodiment of the present invention, is illustrated in FIG. 9. A resistance meter 110 is connected to each unit cell (not shown). The resistance meter 110 measures each cell's resistance by the AC impedance method. A cathode exhaust pump 111 and an anode exhaust pump 112 are used for discharging gas from the cathode and anode of the fuel cell stack 61, respectively, after terminating electrical generation by the fuel cell stack 61. Other components of the fuel cell system 170 are the same as in example 2. The flow of current to the fuel cell stack is controlled by a means 64 of supplying current to the fuel cell stack. The flow chart for this process is the same as in FIG. 3. FIG. 10 illustrates a flow chart of the operation of a means 66 of shutting off the flow of current to the fuel cell stack. The specified value at step 122 is 5V in this example, but it varies with the structure of the fuel cell system. The resistance meter 110 measures each unit cell's resistance and calculates the average unit cell resistance before supplying current at step 120. While current is being supplied, the average unit cell resistance is measured at step 123. If the average cell resistance is higher than the value that is measured at step 120, it is determined that excess water is eliminated from the fuel cell stack 61, and current flow to the fuel cell stack 61 is terminated at step 124.

The embodiments illustrated in the instant disclosure are for illustrative purposes. They should not be construed to limit the scope of the claims. Though the fuel cell systems described are particularly well suited to electrical vehicles, such as automobiles, the instant fuel cell systems are suitable for a wide variety of motor vehicles that are included within the scope of the instant claims including, motorcycles, buses, trucks, recreational vehicles, and agricultural and industrial equipment. As is clear to one of ordinary skill in this art, the instant disclosure encompasses a wide variety of embodiments not specifically illustrated herein.

What is claimed is:

1. A fuel cell system which generates electricity by supplying fuel gas and oxidant gas to a fuel cell stack comprising:
  a fuel cell stack comprising
    water as a by-product of a reaction between fuel gas and oxidant gas,
    a plurality of unit cells, each unit cell including a membrane electrode assembly to generate electricity from the reaction between the fuel gas and oxidant gas, which forms the water as a by-product, the membrane electrode assembly comprising a polymer electrolyte membrane and two electrodes on both sides of and adjacent to the polymer electrolyte membrane,
    a fuel cell stack anode electrically connected to one of the two electrodes, and
    a fuel cell stack cathode electrically connected to the other of the two electrodes,
    wherein each unit cell is immediately adjacent another unit cell;
  a rechargeable battery electrically connected to the fuel cell stack in a parallel connection in which an anode of the battery is electrically connected to the anode of the fuel cell stack, and a cathode of the battery is electrically connected to the cathode of the fuel cell stack, the battery supplies current to the unit cells of the fuel cell stack through the parallel connection to allow the unit cells to electrolyze water therein; and
  a controller programmed to:
    determine whether or not the fuel cell stack is generating electricity, and
    supply current to the unit cells of the fuel cell stack from the battery through the parallel connection to allow the unit cells to electrolyze the water therein, when generation of electricity by the fuel cell stack is terminated, and supply current from the unit cells through the parallel connection to charge the battery when the fuel cell stack generates electricity.

2. The fuel cell system according to claim 1, wherein the fuel cell stack comprises a pair of end plates and at least one unit cell containing a gas diffusion layer in contact with a membrane electrode assembly which is constructed of the polymer electrolyte membrane enclosed between the two electrodes, wherein said at least one unit cell is stacked between the end plates.

3. The fuel cell system according to claim 1, wherein the battery is configured for being charged by electric power from a generator or the fuel cell stack.

4. A motor vehicle comprising a fuel cell system which generates electricity by supplying fuel gas and oxidant gas to a fuel cell stack comprising:
  the fuel cell stack comprising
    water as a by-product of a reaction between fuel gas and oxidant gas,
    a plurality of unit cells, each unit cell including a membrane electrode assembly to generate electricity from the reaction between the fuel gas and oxidant gas, which forms the water as a by-product, the membrane electrode assembly comprising a polymer electrolyte membrane and two electrodes on both sides of and adjacent to the polymer electrolyte membrane,
    a fuel cell stack anode electrically connected to one of the two electrodes, and
    a fuel cell stack cathode electrically connected to the other of the two electrodes,
    wherein each unit cell is immediately adjacent another unit cell;
  a rechargeable battery electrically connected to the fuel cell stack in a parallel connection in which an anode of the battery is electrically connected to the anode of the fuel cell stack, and a cathode of the battery is electrically connected to the cathode of the fuel cell stack, the battery supplies current to the unit cells of the fuel cell stack through the parallel connection to allow the unit cells to electrolyze water therein; and
  a controller programmed to:
    determine whether or not the fuel cell stack is generating electricity, and
    supply current to the unit cells of the fuel cell stack from the battery through the parallel connection to allow the unit cells to electrolyze the water therein, when generation of electricity by the fuel cell stack is terminated, and supply current from the unit cells through the parallel connection to charge the battery when the fuel cell stack generates electricity.

5. An automobile comprising a fuel cell system which generates electricity by supplying fuel gas and oxidant gas to a fuel cell stack comprising:
  the fuel cell stack comprising
    water as a by-product of a reaction between fuel gas and oxidant gas,
    a plurality of unit cells, each unit cell including a membrane electrode assembly to generate electricity from the reaction between the fuel gas and oxidant gas, which forms the water as a by-product, the membrane electrode assembly comprising a polymer electrolyte membrane and two electrodes on both sides of and adjacent to the polymer electrolyte membrane,
    a fuel cell stack anode electrically connected to one of the two electrodes, and
    a fuel cell stack cathode electrically connected to the other of the two electrodes,
    wherein each unit cell is immediately adjacent another unit cell;
  a rechargeable battery electrically connected to the fuel cell stack in a parallel connection in which an anode of the battery is electrically connected to the anode of the fuel cell stack, and a cathode of the battery is electrically connected to the cathode of the fuel cell stack, the battery supplies current to the unit cells of the fuel cell stack through the parallel connection to allow the unit cells to electrolyze water therein; and
  a controller programmed to:
    determine whether or not the fuel cell stack is generating electricity, and
    supply current to the unit cells of the fuel cell stack from the battery through the parallel connection to allow the unit cells to electrolyze the water therein, when generation of electricity by the fuel cell stack is terminated, and supply current from the unit cells through the parallel connection to charge the battery when the fuel cell stack generates electricity.

6. A method of removing water from a fuel cell system, said fuel cell system comprising:

a fuel cell stack comprising
water as a by-product of a reaction between fuel gas and oxidant gas,
a plurality of unit cells, each unit cell including a membrane electrode assembly to generate electricity from the reaction between the fuel gas and oxidant gas, which forms the water as a by-product, the membrane electrode assembly comprising a polymer electrolyte membrane and two electrodes on both sides of and adjacent to the polymer electrolyte membrane,
a fuel cell stack anode electrically connected to one of the two electrodes, and
a fuel cell stack cathode electrically connected to the other of the two electrodes, wherein each unit cell is immediately adjacent another unit cell;
a rechargeable battery electrically connected to the fuel cell stack in a parallel connection in which an anode of the battery is electrically connected to the anode of the fuel cell stack, and a cathode of the battery is electrically connected to the cathode of the fuel cell stack, the battery supplies current to the unit cells of the fuel cell stack through the parallel connection to allow the unit cells to electrolyze the water therein; and
a programmable controller, comprising the steps of:
generating electricity from the fuel cell stack by supplying fuel gas and oxidant gas to the fuel cell stack;
terminating the generation of electricity from the fuel cell stack;
determining that the generation of electricity by the fuel cell stack has terminated using said programmable controller; and
using said programmable controller to supply current to the fuel cell stack from the rechargeable battery.

7. The method according to claim 6, further comprising charging said battery with electric power from said fuel cell stack.

8. The method according to claim 6, further comprising:
measuring the flow of said current to the fuel cell stack; and
controlling the flow of said current to the fuel cell stack.

9. The method according to claim 8, wherein the flow of said current to the fuel cell stack reaches a predetermined amperage by controlling a voltage impressed on the fuel cell stack.

10. The method according to claim 8, wherein the flow of said current to said plurality of unit cells in the fuel cell stack is independently controlled.

11. The method according to claim 6, further comprising shutting off the flow of said current when the duration of the current flow to the fuel cell stack reaches a predetermined time.

12. The method according to claim 6, further comprising:
measuring a flow rate of fuel gas in a gas discharged from a fuel gas discharge port of the fuel cell stack; and
shutting off the flow of said current to the fuel cell stack if the flow rate of the fuel gas falls below a value that is measured before supplying said current to the fuel cell stack.

13. The method according to claim 6, further comprising:
measuring humidity of a gas discharged from a fuel gas discharge port or an oxidant gas discharge port of the fuel cell stack; and
shutting off the flow of said current to the fuel cell stack if the humidity of the gas discharged from said fuel gas discharge port or said oxidant gas discharge port falls below a predetermined value.

14. The method according to claim 6, further comprising:
measuring moisture content of a polymer electrolyte membrane in the fuel cell stack; and
shutting off the flow of said current to the fuel cell stack if the moisture content of the polymer electrolyte membrane falls below a predetermined value.

15. The method according to claim 14, wherein the step of measuring a moisture content of a polymer electrolyte membrane in the fuel cell stack comprises measuring electrical resistance of at least some of the unit cells in the fuel cell stack; and calculating the moisture content based on the resistance of said unit cells.

16. The method according to claim 6, further comprising simultaneously discharging fuel cell gas and oxidant gas remaining in the fuel cell stack.

17. The method according to claim 16, further comprising burning fuel gas discharged from the fuel cell stack after terminating the generation of electricity from the fuel cell stack.

* * * * *